United States Patent
Chen et al.

(10) Patent No.: US 8,265,053 B2
(45) Date of Patent: Sep. 11, 2012

(54) CONFIGURATION OF RANK INDICATOR REPORTING INSTANCES

(75) Inventors: Runhua Chen, Dallas, TX (US); Tarik Muharemovic, Dallas, TX (US); Eko N. Onggosanusi, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 497 days.

(21) Appl. No.: 12/539,151

(22) Filed: Aug. 11, 2009

(65) Prior Publication Data

US 2010/0041390 A1 Feb. 18, 2010

Related U.S. Application Data

(60) Provisional application No. 61/088,081, filed on Aug. 12, 2008.

(51) Int. Cl.
 H04B 7/216 (2006.01)
 H04W 72/00 (2009.01)
 H04K 1/10 (2006.01)
(52) U.S. Cl. .......... 370/342; 455/450; 375/260

(58) Field of Classification Search .......... 370/232, 370/235, 331–333; 455/452
See application file for complete search history.

(56) References Cited

U.S. PATENT DOCUMENTS

2008/0043867 A1* 2/2008 Blanz et al. .......... 375/260
2008/0057969 A1* 3/2008 Agami et al. .......... 455/450

* cited by examiner

Primary Examiner — Ian N Moore
Assistant Examiner — Afshawn Towfighi
(74) Attorney, Agent, or Firm — Robert D. Marshall, Jr.; Wade James Brady, III; Frederick J. Telecky, Jr.

(57) ABSTRACT

A method for setting a periodicity and an offset in rank indicator (RI) reporting in a user equipment in a wireless communication system receives a radio resource control (RRC) signal from a base station, decodes a RI periodicity and offset configuration index, sets the periodicity and offset in accordance with said decoded periodicity and offset configuration index and reports a RI according to the set periodicity and offset. The periodicity is an integer and reporting a RI reports with equal the product of the periodicity and a period of reporting of the channel quality indicator (CQI) and the preceding matrix indicator (PMI).

4 Claims, 4 Drawing Sheets

CONFIGURATION OF RANK INDICATOR REPORTING INSTANCES

CLAIM OF PRIORITY

This application claims priority under 35 U.S.C. 119(e)(1) to U.S. Provisional Application No. 61/088,081 filed Aug. 12, 2008.

TECHNICAL FIELD OF THE INVENTION

The technical field of this invention is mobile wireless telephones.

BACKGROUND OF THE INVENTION

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up link 111 time or frequency or code resources. If UE 109 has data ready for transmission, which may be traffic data, measurements report, tracking area update, UE 109 can transmit a random access signal on up link 111. The random access signal notifies base station 101 that UE 109 requires up link resources to transmit the UEs data. Base station 101 responds by transmitting to UE 109 via down link 110, a message containing the parameters of the resources allocated for UE 109 up link transmission along with a possible timing error correction. After receiving the resource allocation and a possible timing advance message transmitted on down link 110 by base station 101, UE 109 optionally adjusts its transmit timing and transmits the data on up link 111 employing the allotted resources during the prescribed time interval.

FIG. 2 shows the Evolved Universal Terrestrial Radio Access (E-UTRA) time division duplex (TDD) Frame Structure. Different subframes are allocated for downlink (DL) or uplink (UL) transmissions. Table 1 shows applicable DL/UL subframe allocations.

TABLE 1

| Configuration | Switch-point periodicity | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

SUMMARY OF THE INVENTION

A method for setting a periodicity and an offset in rank indicator (RI) reporting in a user equipment in a wireless communication system receives a radio resource control (RRC) signal from a base station, decodes a RI periodicity and offset configuration index, sets the periodicity and offset in accordance with said decoded periodicity and offset configuration index and reports a RI according to the set periodicity and offset. The periodicity is an integer and reporting a RI reports with a periodicity equal to the product of the RI integer periodicity and a period of reporting of the channel quality indicator (CQI) and the preceding matrix indicator (PMI).

BRIEF DESCRIPTION OF THE DRAWINGS

These and other aspects of this invention are illustrated in the drawings, in which.

DETAILED DESCRIPTION OF PREFERRED EMBODIMENTS

Figure 1:
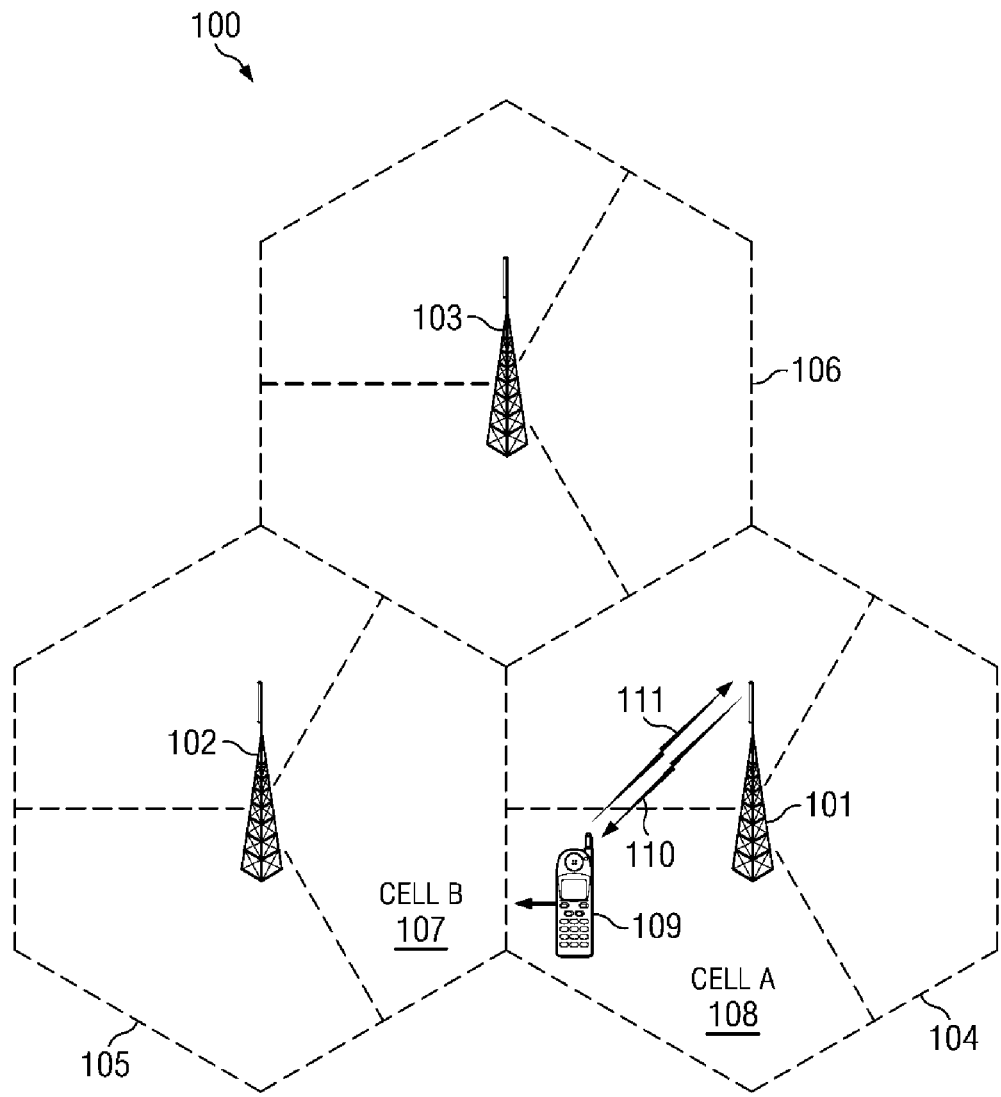
FIG. 1 is a diagram of a communication system of the prior art related to this invention having three cells.
Figure 2:
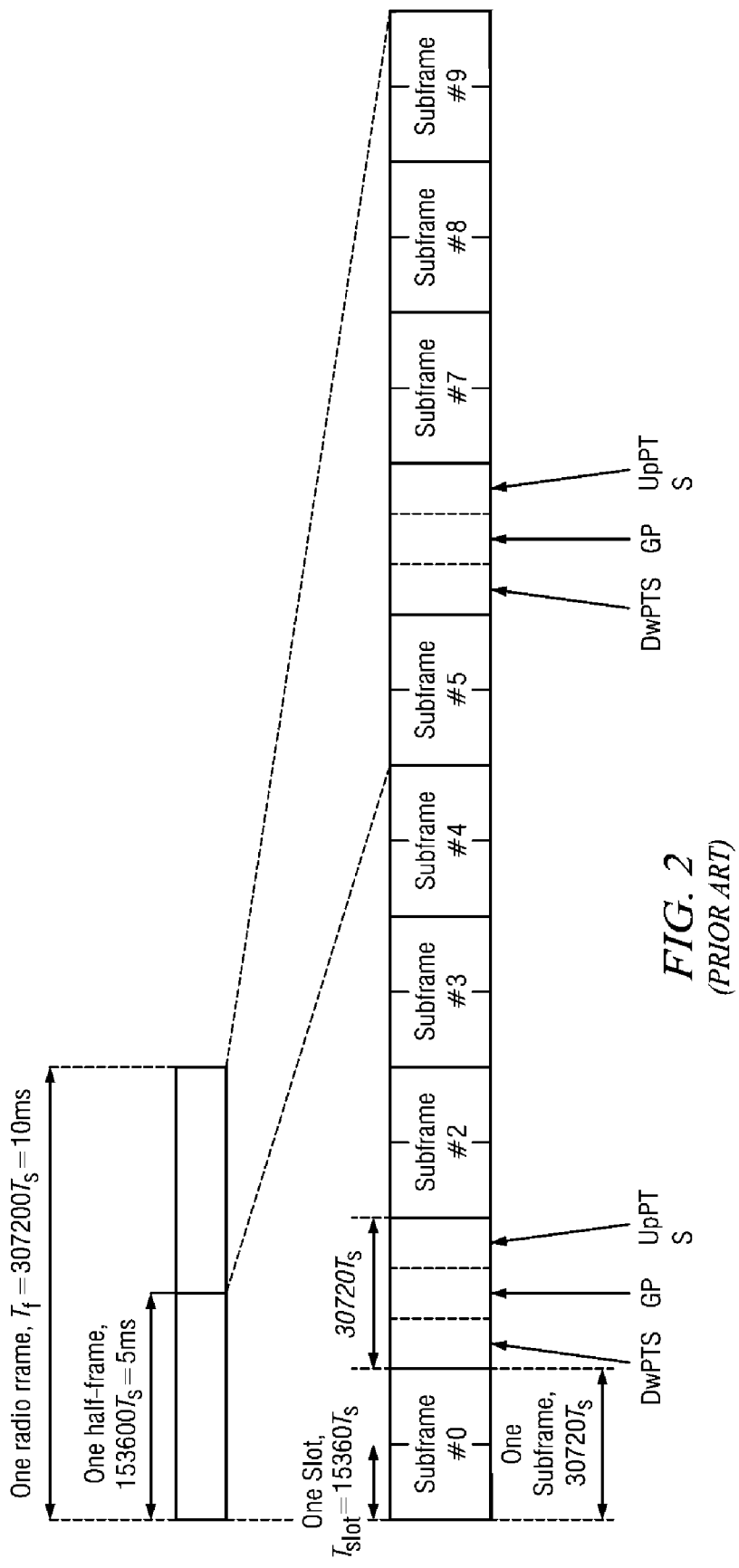
FIG. 2 shows the Evolved Universal Terrestrial Radio Access (E-UTRA) Time Division Duplex (TDD) frame structure of the prior art.

With spatial multiplexing, base station (Evolved Universal Terrestrial Radio Access Node B or eNB) may send multiple data streams or layers to UEs in downlink transmission using the same frequency. The number of such layers or streams is defined as the rank. For LTE Rel-8, UE 109 needs to estimate the DL channel and report the recommended rank indicator (RI) to eNB 101. UE 109 also must report the channel quality indicator (CQI) and the preceding matrix indicator (PMI). These indicators form a set of recommended transmission property to eNB 109. Upon receiving this feedback from UE 109 (RI/PMI/CQI), eNB 101 performs corresponding downlink scheduling.

RI, CQI and PMI are fed back from UE 109 to eNB 101 on Physical Uplink Control CHannel (PUCCH). Both RI and a combined CQI/PMI are reported periodically but with different periodicity. The RI feedback periodicity is generally $M_{RI}$ times greater than the CQI/PMI periodicity. $M_{RI}$ is generally an integer value. In addition, an offset between the RI reporting subframe and the CQI/PMI reporting subframe is denoted $N_{OFFSET,RI}$. $M_{RI}$ and $N_{OFFSET,RI}$ are jointly encoded, and sent by eNB 101 to UE 109 in a Radio Resource Control (RRC) message.

For periodic Rank Indicator (RI), Channel Quality Indicator (CQI) and precoding matrix indicator (PMI) reporting such as on Physical Uplink Control CHannel (PUCCH) of 3GPP (E-UTRA), RI and CQI/PMI are separately reported.

These are not reported in the same subframe. The CQI/PMI reporting has a periodicity P in subframes and a reporting offset $N_{OFFSET}$ in subframes which uniquely determines the reporting instances of CQI/PMI. The reporting interval of the RI reporting is an integer multiple $M_{RI}$ of wideband CQI/PMI period P in subframes. Exemplary values of $M_{RI}$ are (1, 2, 5, 10, 20, 40, OFF) in 3GPP E-UTRA. The RI reporting also employs a RI reporting offset $N_{OFFSET,RI}$ defined relative to the CQI/PMI reporting offset $N_{offset}$.

The reporting periodicity and offset for CQI/PMI are jointly encoded and semi-statically configured by higher-layer Radio Resource Control (RRC) message. The invention includes the following procedures to determine the parameters of RI reporting.

In a first embodiment, the RI reporting offset and periodicity are separately encoded and semi-statically configured. This configuration is signaled to the UE 109 by a higher-layer RRC message.

In a second embodiment, the RI reporting offset and periodicity are jointly encoded and semi-statically configured. This configuration can be signaled to the UE 109 by a higher-layer RRC message.

In a third embodiment, a RI periodicity and offset configuration index $I_{RI}$ is used to signal the RI periodicity $M_{RI}$ (which is an integral multiple of the CQI/PMI periodicity P) and a RI offset $N_{OFFSET,RI}$. The value of RI offset $N_{OFFSET,RI}$ is specified by $-I_{RI}+n$. The RI periodicity and offset configuration index $I_{RI}$ is signaled in a RRC message. The quantity n is a pre-defined variable. Thus subtracting $I_{RI}$ from the fixed value n uniquely determines the RI multiple offset $N_{OFFSET,RI}$. The variable n is a pre-defined function of the RI periodicity $M_{RI}$ and the offset configuration index $I_{RI}$. In one embodiment, n is related to the maximum CQI/PMI reporting offset of 160 in 3GPP E-UTRA. In another embodiment, n is an integer multiple of the maximum CQI/PMI offset.

Table 2 lists the mapping of RI Configuration Index $I_{RI}$ to $M_{RI}$ and $N_{OFFSET,RI}$ with n determined by the range of $I_{RI}$.

TABLE 2

| RI Periodicity and Offset Configuration Index $I_{RI}$ | Value of Peridocity $M_{RI}$ | Value of Offset $N_{OFFSET,RI}$ |
| --- | --- | --- |
| $0 \leq I_{RI} \leq 159$ | 1 | $-I_{RI}$ |
| $160 \leq I_{RI} \leq 319$ | 2 | $-I_{RI}+160$ |
| $320 \leq I_{RI} \leq 479$ | 5 | $-I_{RI}+320$ |
| $480 \leq I_{RI} \leq 639$ | 10 | $-I_{RI}+480$ |
| $640 \leq I_{RI} \leq 799$ | 20 | $-I_{RI}+640$ |
| $800 \leq I_{RI} \leq 959$ | 40 | $-I_{RI}+800$ |
| $960 = I_{RI}$ | OFF | NA |
| $961 \leq I_{RI} \leq 2047$ | Reserved | |

Figure 3A:
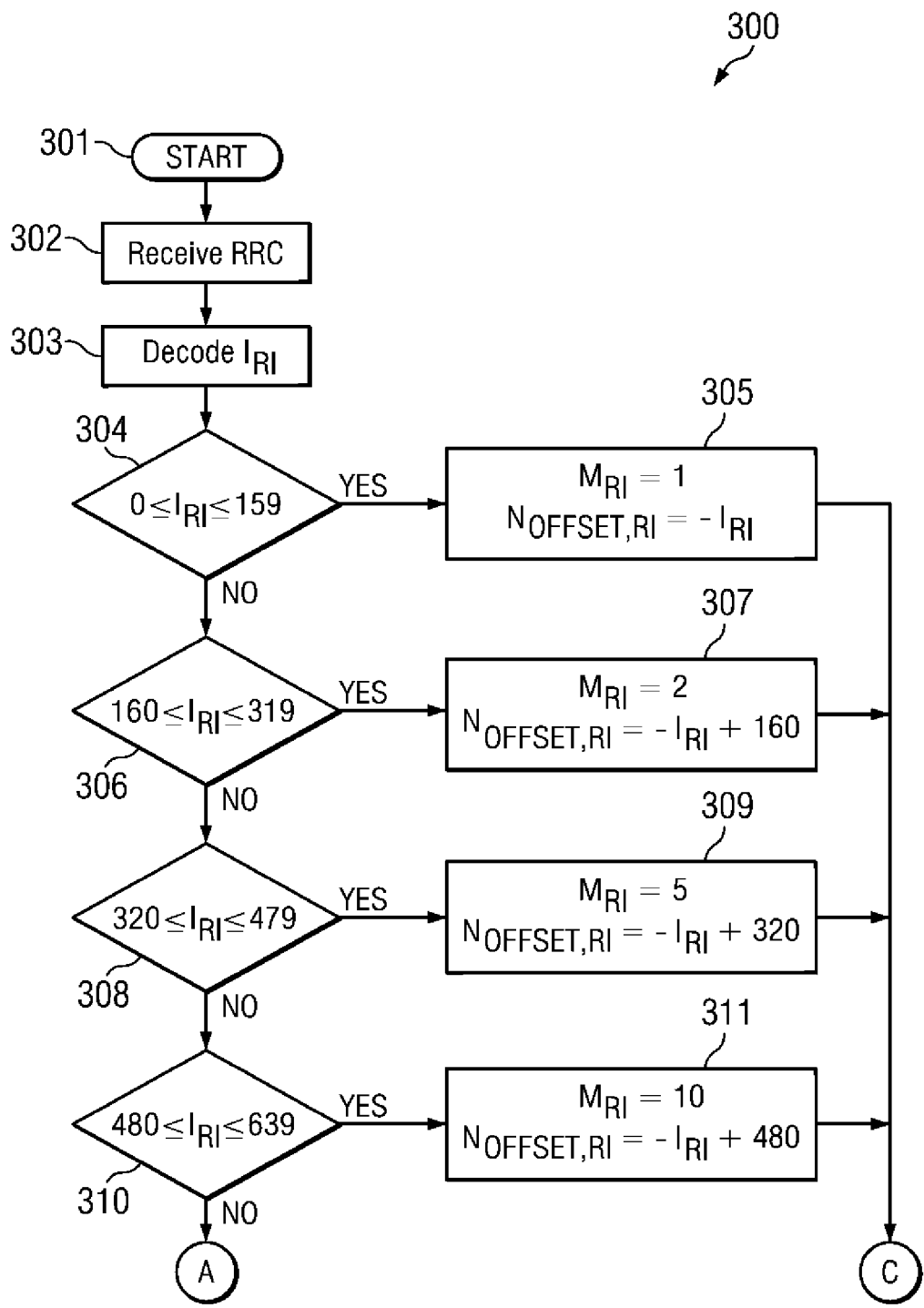
FIGS. 3(a) and 3(b) together illustrate a flow chart of method 300 of operation of UE 109 in accordance with this invention.
Figure 3B:
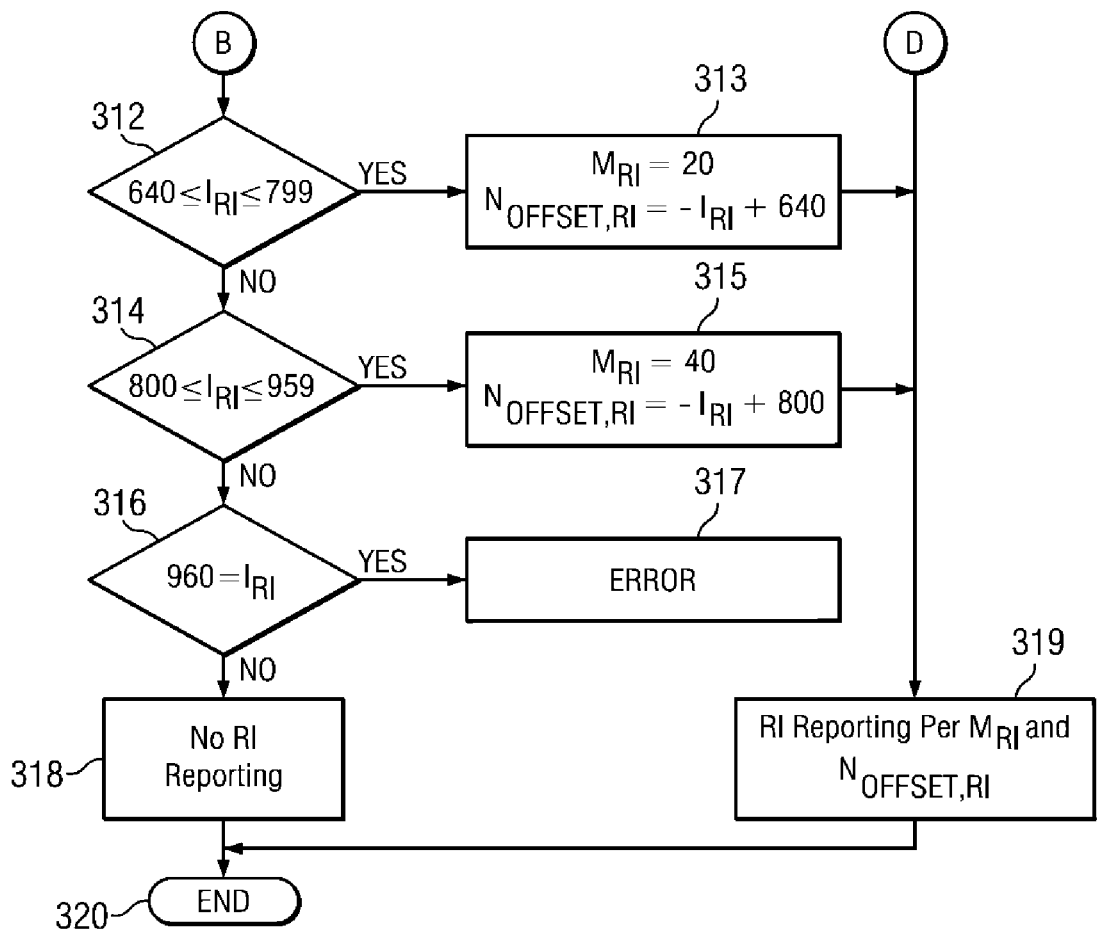

FIGS. 3(a) and 3(b) illustrate a flow chart of method 300 of operation of UE 109 in accordance with this invention with n=160. Method 300 begins with start block 301. Method 300 next receives the RRC in block 302 and decoded $I_{RI}$ in block 303. Method 300 proceeds to test block 304.

Test block 304 determines if $I_{RI}$ is between 0 and 159 inclusive. If this is true (Yes at test block 304), then block 305 sets $M_{RI}=1$ and $N_{OFFSET,RI}=-I_{RI}$. Method 300 the proceeds to block 319 via links C and D. If this in not true (No at test block 304), then method 300 proceeds to test block 306.

Test block 306 determines if $I_{RI}$ is between 160 and 319 inclusive. If this is true (Yes at text block 306), then block 307 sets $M_{RI}=2$ and $N_{OFFSET,RI}=-I_{RI}+160$. Method 300 the proceeds to block 319 via links C and D. If this in not true (No at test block 306), then method 300 proceeds to test block 308.

Test block 308 determines if $I_{RI}$ is between 320 and 479 inclusive. If this is true (Yes at text block 308), then block 309 sets $M_{RI}=5$ and $N_{OFFSET,RI}=-I_{RI}+320$. Method 300 the proceeds to block 319 via links C and D. If this in not true (No at test block 308), then method 300 proceeds to test block 310.

Test block 310 determines if $I_{RI}$ is between 480 and 639 inclusive. If this is true (Yes at text block 310), then block 311 sets $M_{RI}=10$ and $N_{OFFSET,RI}=-I_{RI}+480$. Method 300 the proceeds to block 319 via links C and D. If this in not true (No at test block 310), then method 300 proceeds to test block 312 via links A and B.

Test block 312 determines if $I_{RI}$ is between 640 and 799 inclusive. If this is true (Yes at text block 312), then block 313 sets $M_{RI}=20$ and $N_{OFFSET,RI}=-I_{RI}+640$. Method 300 then proceeds to block 319. If this in not true (No at test block 312), then method 300 proceeds to test block 314.

Test block 314 determines if $I_{RI}$ is between 800 and 959 inclusive. If this is true (Yes at text block 314), then block 315 sets $M_{RI}=40$ and $N_{OFFSET,RI}=-I_{RI}+800$. Method 300 then proceeds to block 319. If this in not true (No at test block 314), then method 300 proceeds to test block 316.

Test block 316 determines if $I_{RI}$ equals 960. If this is true (Yes at text block 316), then block 318 determines that no RI signaling will occur. Method 300 then proceeds to end block 320 which ends method 300. If this in not true (No at test block 316), then $I_{RI}$ is out of range and method 300 proceeds to error block 317.

Blocks 305, 307, 309, 311, 313 and 315 set $M_{RI}$ and $N_{OFFSET,RI}$ according to the received value of $I_{RI}$. Block 319 enables RI reporting by UE 109 according to the determined values of $M_{RI}$ and $N_{OFFSET,RI}$. Method 300 then proceeds to end block 320 which ends method 300.

What is claimed is:

1. A method for setting a periodicity $M_{RI}$, wherein $M_{RI}$ is an integer, and an offset $N_{OFFSET,RI}$ in rank indicator (RI) reporting in a user equipment in a wireless communication system comprising the steps of:
   receiving a radio resource control (RRC) signal from a base station;
   decoding a RI periodicity and offset configuration index $I_{RI}$ transmitted in the received RRC signal;
   setting the periodicity $M_{RI}$ and the offset $N_{OFFSET,RI}$ in accordance with said decoded $I_{RI}$; and
   reporting a RI according to said set periodicity $M_{RI}$ and offset $N_{OFFSET,RI}$ having a period equal to the product of the periodiciy $M_{RI}$ multiplied by a period of reporting of the channel quality indicator (CQI) and the precoding matrix indicator (PMI).

2. The method of claim 1, wherein:
   said step of setting the periodicity $M_{RI}$ and the offset $N_{OFFSET,RI}$
   if $0 \leq I_{RI} \leq 159$ setting the periodicity $M_{RI}$ equal to 1 and the offset $N_{OFFSET,RI}$ equal to $-I_{RI}$,
   if $160 \leq I_{RI} \leq 319$ setting the periodicity $M_{RI}$ equal to 2 and the offset $N_{OFFSET,RI}$ equal to $-I_{RI}+160$,
   if $320 \leq I_{RI} \leq 479$ setting the periodicity $M_{RI}$ equal to 5 and the offset $N_{OFFSET,RI}$ equal to $-I_{RI}+320$,
   if $480 \leq I_{RI} \leq 639$ setting the periodicity $M_{RI}$ equal to 10 and the offset $N_{OFFSET,RI}$ equal to $-I_{RI}+480$,
   if $640 \leq I_{RI} \leq 799$ setting the periodicity $M_{RI}$ equal to 20 and the offset $N_{OFFSET,RI}$ equal to $-I_{RI}+640$, and
   if $800 \leq I_{RI} \leq 959$ setting the periodicity $M_{RI}$ equal to 40 and the offset $N_{OFFSET,RI}$ equal to $-I_{RI}+800$.

3. The method of claim 2, further comprising:
   not reporting a RI if $I_{RI}=960$.

4. A method for setting a periodicity $M_{RI}$ and an offset $N_{OFFSET,RI}$ in rank indicator (RI) reporting in a user equipment in a wireless communication system comprising the steps of:

receiving a radio resource control (RRC) signal from a base station;

decoding a RI periodicity and offset configuration index $I_{RI}$ transmitted in a received RRC signal;

setting the periodicity $M_{RI}$ and the offset $N_{OFFSET,RI}$ by setting the offset $N_{OFFSET,RI}$ equal to $-I_{RI}+n$, wherein n is a positive integer constant; and reporting a RI according to said set periodicity $M_{RI}$ and offset $N_{OFFSET,RI}$.

\* \* \* \* \*